United States Patent [19]

Francisco-Arnold

[11] 4,274,757
[45] Jun. 23, 1981

[54] IMMERSION/SUSPENSION METHOD FOR THE SUBMARINE DEPLOYMENT OF HIGH VOLTAGE TRANSMISSION CABLE

[76] Inventor: Richard D. Francisco-Arnold, P.O. Box 452, Bronxville, N.Y. 10708

[21] Appl. No.: 732,211

[22] Filed: Oct. 14, 1976

[51] Int. Cl.³ .............................................. F16L 1/04
[52] U.S. Cl. .................................... 405/161; 405/162
[58] Field of Search ................. 61/105, 107, 112, 113, 61/114, 69 R, 72.2; 114/230, 235, 5 F; 9/8; 340/4 R

[56] References Cited

U.S. PATENT DOCUMENTS

| 3,173,271 | 3/1965 | Wittgenstein | 61/113 |
|---|---|---|---|
| 3,550,549 | 12/1970 | Horton | 114/230 |
| 3,795,759 | 3/1974 | Rhyne | 114/235 B |
| 3,921,238 | 11/1975 | Johnson | 9/1 R |

FOREIGN PATENT DOCUMENTS

| 1260389 | 3/1961 | France | 174/101.5 |
|---|---|---|---|
| 2705 | of 1865 | United Kingdom | 61/107 |

Primary Examiner—Dennis L. Taylor

[57] ABSTRACT

A method, as well as applied apparatus facilitating the free-floating, controlled suspension deployment of all semi-flexible and non-buoyant high voltage submarine electrical power transmission conduit/cable; including shore to shore interconnection installations employing the said method and apparatus in at least some portion thereof. The said method provides for deployment at specific depths of submersion between the surface and the bottom of a body of water, via tangentially applied flotation support and tethering stabilization apparatus, so employed to provide relative free-flotation of the said conduit/cable at approximately specific gravity at the specified depth of deployment, while facilitating maximum heat dissipation requirements attendant their thermally active functional character.

2 Claims, 16 Drawing Figures

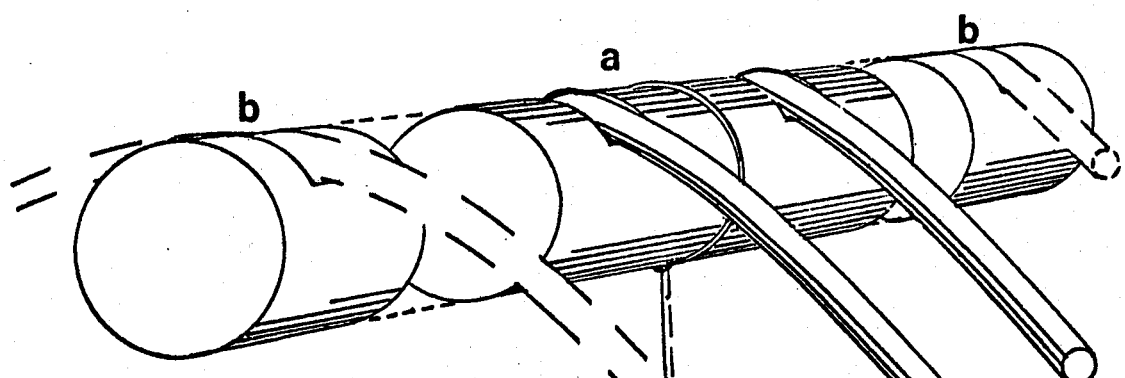
FIG. 6
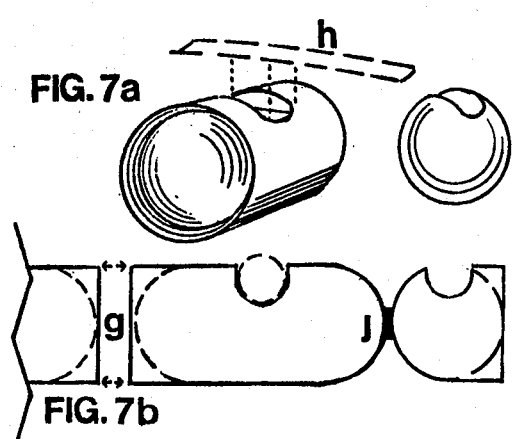
FIG. 7a
FIG. 7b
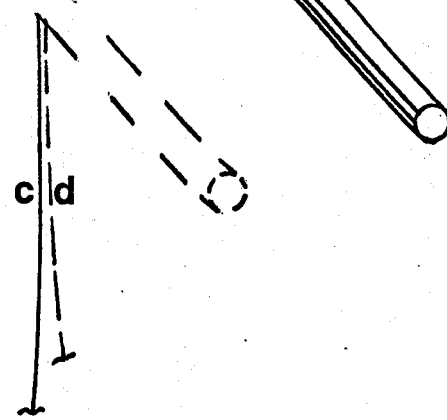
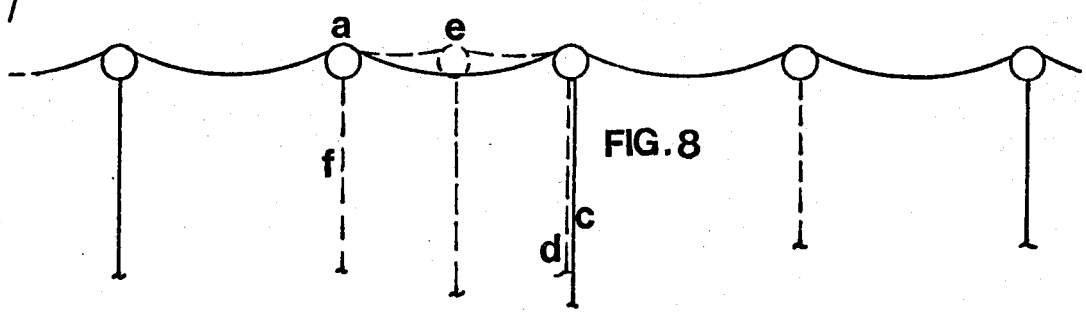
FIG. 8
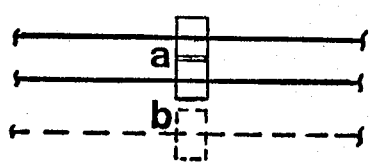
FIG. 9

IMMERSION/SUSPENSION METHOD FOR THE SUBMARINE DEPLOYMENT OF HIGH VOLTAGE TRANSMISSION CABLE

SUMMARY

A method, as well as applied apparatus competent to permanently support, position and stabilise the flexible, non-buoyant character of said conduit/cable or a plurality thereof at any predetermined depth-level sufficiently below the surface of a body of water in order not to interfere with surface or submerged craft and sea creatures, and where dense stable hydroatmospheric conditions are most readily conducive to stable deployment; yet sufficiently within the range of said conduit/cable depth-pressure operative capacities and surface access requirements for any total system deployment or any part thereof, including shore to shore installations.

The component apparatus herein detailed is principally comprised of; a plurality of both modular buoyant support vehicles and flexible tethering-mooring lines attached thereto and anchored at the sea bottom; deployed in size, number, configuration and composition along the linear route of the conduit/cable as required for permanent support, positioning and stabilisation at approximately specific gravity at specified depth.

It is a principal object of this invention to provide a means for free-flotation suspension deployment of all types of self contained, semi-flexible, thermally active submarine high voltage power transmission conduit/cable or plurality thereof; and within at least some portion of any installation.

It is another object of this invention to provide independently sectionalized buoyant means to support said conduit/cable (A) so as to insure buoyant support in the event that one or more buoyant sections should become inoperative, and (B) in such manner of non-encasing tangential deployment so as to provide maximum heat disipation of the thermally active high voltage conduit/cable during standard heat cycling operation.

It is yet another object of this invention to provide apparatus in order to achieve the said method of deployment, and thereby allow for (A) improved access to the said conduit/cable for repair and maintanence, and offer (B) an improved free-floating method of installation to meet any hydroatmospheric conditions as may exist with respect to installation.

DRAWINGS

FIG. 2b additionally illustrates a deployment pattern useful for unit surfacing; as does illustration (a) of catanary curvature throughout.

FIG. 6 illustrates the first preferred embodiment; wherein the cable or pipe is supported directly upon the said means (a) at a perpendicular axis to the conduit/cable routing; and (b) being supplimentary supports, interconnectable at the outer extremities for additional conduit/cable installation in parallel. Tethering/mooring line (c), being at least one of a required number (d) for multi-point deployment installation, from a central point at the underside of the key support or supports initially deployed; or as required for proper hydrodynamic stability.

FIG. 7a illustrates a three quarter view of support, with (h) indicating potential use of a carrier support for maintaining radial integrity of flexible means under support. While (FIG. 7b) further delineates support end structural configuration; and as more clearly illustrated in cross sectional side elevation the said end structure (g) and the manner of support interconnection for multiple modular use. FIG. (j) shows direct interlock method.

FIG. 8 illustrates variable deployment of supports in side elevation according to radial catenary and free movement; wherein (a) is a larger capacity support, and (e) is additional intermediate alternative for increaed support and reduced catenary over a given distance. FIG. (f) indicates optional tetherings. FIG. (d) is aforementioned multiple tethering at a single vortex.

FIG. 9 is a plan view of a section of FIG. 8 illustrating modular supports according to subsequent system requirements; wherein (d) thus provides for additional tethers as may be subsequently required for combinations of (a) and (b) supports.

Figure 10:
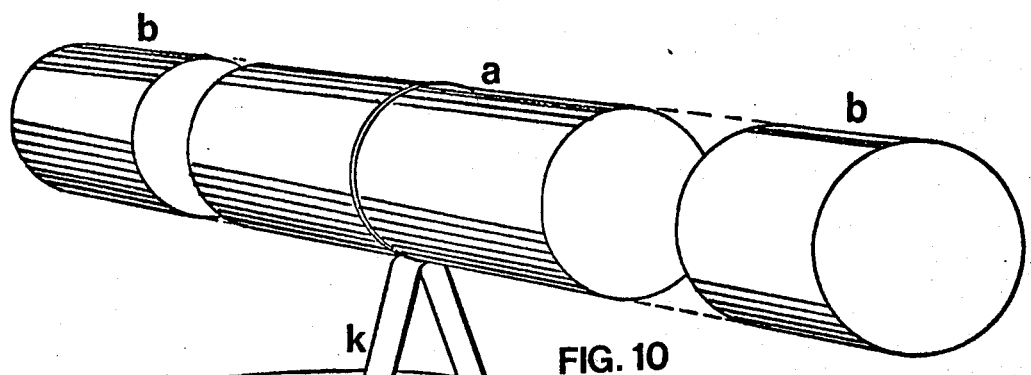

FIG. 10 illustrates a second embodiment of the invention; wherein the conduit/cable is indirectly supported by a third intermediate element (k); which may be subsequently extended by additional elements (m), most likely in combination with supplimentary supports (b). FIG. (m) would further accommodate means (h) of FIG. 7. The proximity of (a), (b) with (k), (m) is subject to any configuration, including parallel use of (a), (b), with (k), (m) located centrally between, or as desired, especially for hydrodynamic stability. (see FIG. 12).

Figure 1:
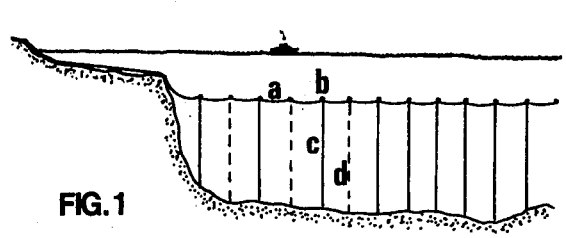
FIG. 1 is a sectional deployment elevation as it might appear as deployed along a shallow bank into deeper water; with (a) being the conduit/cable as suspended between (b) individual support vehicles, and (c) being the tethering/mooring line, and (d) being possible consecutive exclusion of said line.
Figure 2:
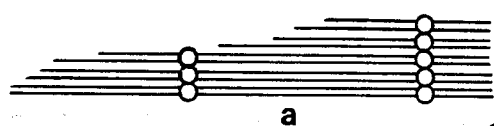
FIG. 2a is a plan view of a plurality of conduit/cable fastened in parallel to modular buoy support vehicles themselves fastened in parallel over a two dimensional horizontal plane.
FIG. 2b is a plan view in the manner of FIG. 2a except deployed over a horizontally transversed patter. The illustration further indicates—via the dotted lines—the ability to vary the degree and dimensional width of said angulated pattern.
Figure 3A:
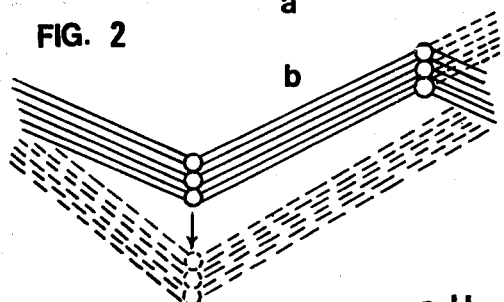
FIG. 3a illustrates a close up elevation of a portion of FIG. 1, wherein the distance between buoy support vehicles is indicated on an arbitrary basis. Attached view (bb) illustrates a buoy vehicle of larger dimensions and conduit/cable support capacity, with vertically parallel, multiple conduit/cables supported.
Figure 4:
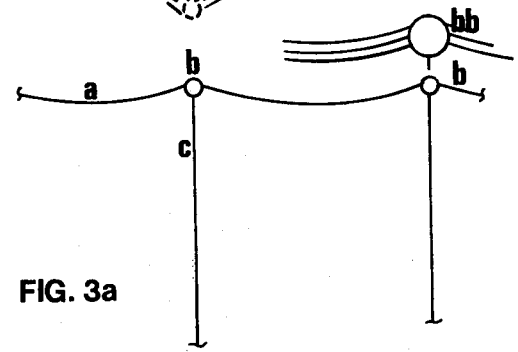
FIG. 4 is a perspective view of a deployment in various stages of deployment from a theoretical point on the sea floor; wherein (c) is the mooring line, (g) the anchoring means, and (h) additional tethers are required.
Figure 3B:
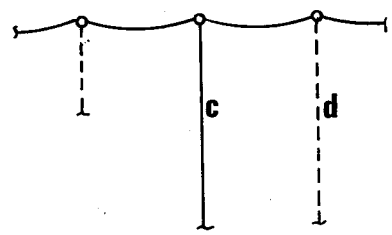
FIG. 3b illustrates the same scale as FIG. 3a, except utilising double the number of buoy support vehicles spaced at one half the distance between buoys and being theoretically one half the size and buoyant capacity of (b) of FIG. 3a, on a constant basis.
Figure 3C:
FIG. 3c is yet another illustration of reduced buoy dimensions and spacing in the manner and on the same basis and scale as described in FIG. 3a and 3b. In all FIG. 3 illustrations (d) indicates optional use of consecutive tethering lines.
Figure 11:
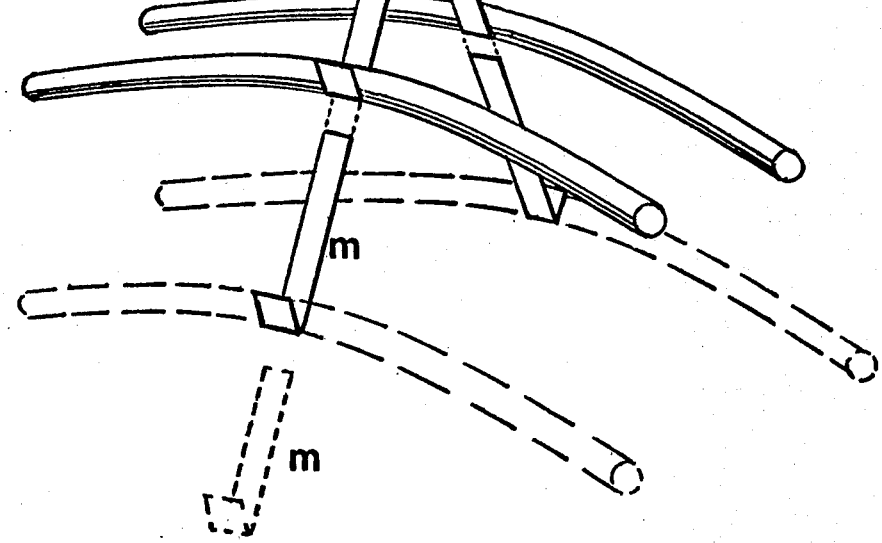
Figure 11:
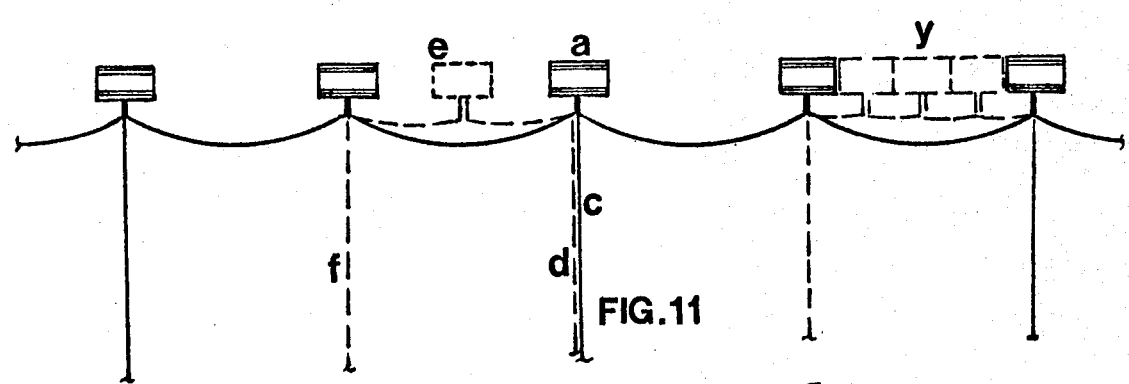

FIG. 11 illustrates said second embodiment in a similar manner as FIG. 3; wherein (e) can be effectively interlinked in sufficient numbers as to allow for virtually completely interconnected support. FIG. (y) illustrates fully interconnected supports.

Figure 12:
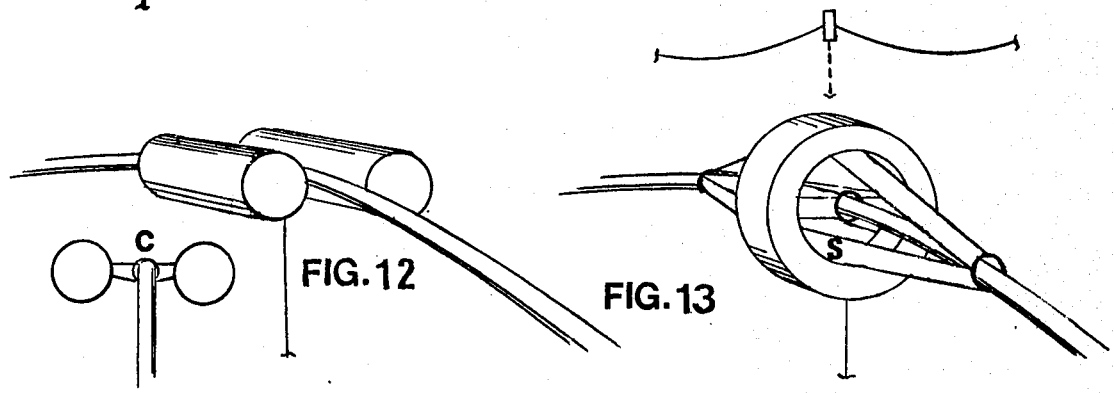

FIG. 12 illustrates further embodiments of FIG. 10 wherein it constitutes support units in parallel pairs, with intermediate carrier element interconnecting all elements centrally.

Figure 13:
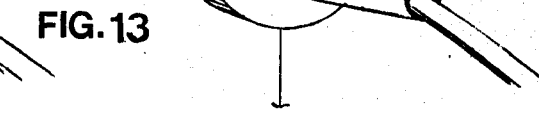

FIG. 13 is still another embodiment, wherein support element is entirely disposed about the said conduit/cable, with (s) being carrier support for maintaining conduit radial integrity. This carrier support may be constructed in a flexible or rigid form with outrigger elements adjusted for any required radial cable curvature leading up to and away from the said support vehicle.

It is important to note that many configurations of the above basic methods are possible, especially according to specific dictates of particular cable design, as well as deployment circumstances and ambient conditions. A key factor with respect to the said cable is that support contact should be minimized where possible, with as much free flow afforded about the said cable for maximum cyclical cooling of the conductor.

With further consideration to FIG. 10 intermediate elements (k) and (m) might likely vary in configuration in accordance with requirements of said means (h)—of FIG. 7, as aforementioned—for maintaining correct said radial curvature of said conduit/cable.

FIG. 12c may further lend example of a modular interconnection member, wherein all principal elements would be secured into functional combination.

With respect to weighting compensation means as may be modularly employed in combination with said flotation support means, these would appear no different in configuration than the flotation embodiments indicated throughout; however they would likely be smaller in at least the cylindrical dimension where employed between or at the extremeties of any flotation support or supports.

The radial carrier support element indicated by FIG. 7a (h) would merely be modified to whatever type and configuration was chosen (such as a tubular braided choke sleeve), and secured directly to the flotation supports as in FIG. 7a, or to the support flanges as in FIG. 10 (m).

SPECIFICATION

In order to facilitate the deployment of this type of flexible, non-buoyant submarine high voltage power transmission conduit/cable on a continuous preselected depth-level range below the surface of a body of water via free-flotation of the said conduit/cable within a prescribed range, a method and applied component apparatus are herein detailed according to envisioned deployment requirements.

Said component apparatus is principally comprised of; (1) a plurality of modular presized, fixed displacement buoy support vehicles following the linear route of the conduit/cable, affixed thereto, and modularly interconnectable to permit support of multiple conduit/cable/circuits deployed in horizontal and/or vertical parallel proximity to one another and utilising complimentary tethering apparatus. Said pre-sized vehicles would be constructed in a suitable size, manner and configuration so as to retain their form and buoyancy at the maximum possible depth-pressure so encountered in any given deployment, as well as over the estimated life of said vehicles while supporting said conduit/cable. The material of construction of said vehicles to be determined through testing and manufacturers discretion as to that most suitable for a given application or plurality thereof.

More specifically relating to the above; the size of said buoy support vehicles for any given deployment application would be determined by the following plurality of factors; (A) the weight and number of intended conduit/cable to be supported, (B) the number of said vehicles to be utilised to support said conduit/cable or plurality thereof over a given distance, or expressed as a ratio of vehicle number to incremental distance of a system or part thereof, and (C) the water density factor at the depth of contemplated deployment for each individual application of system. The configuration of said vehicles for any given deployment application would be determined by the following plurality of factors; (A) depth-pressure resistance at the intended maximum depth-level range of deployment. Such configuration is generally assumed in similar application, though not expressly specified herein, to be spherical in its purest form and expanding two dimensionally therefrom into a cylindrical/spherically ended form with a smooth or corrugated skin surface, and (B) the number and positioning of conduit/cable per each individual vehicle and/or as said number and positioning relates to a modular plurality of vehicles affixed to one another and forming an expensive deployment network, and (C) the manner in which conduit/cable or a plurality thereof is affixed to said vehicles, as well as the manner in which the tethering-mooring apparatus is affixed to said vehicles (see FIGS. 2, 4, 6, 7, 10 and 12 of Drawing). The positioning of said vehicles, both with respect to one another as thay relate to the linear support of the conduit/cable or plurality thereof over a given distance in parallel proximity, with full regard to the above considerations as they would relate as a consequence hereto, as well as with respect to the degree of 'catenary slack' for sectional surfacing and free movement requirements, would determine the degree of naturally induced catenary curvature of the conduit/cable between said vehicles; due to the non-buoyant, flexible nature of the said conduit/cable, and its physical characteristics when suspended in a liquid. Hence, it is generally intended that where buoy support vehicle (or vehicles as related to multiple conduit/cable support) are spaced along the linear route of the conduit/cable in such manner that the said vehicles are not interconnected, said buoy vehicles would be interconnected by said conduit/cable exclusively; except in the instance of extreme hydroatmospheric conditions where a separate flexible tension member may be employed. The above remaining true in all instances except where said support vehicles are utilised in sufficient numbers for a given linear distance so as to form a fully interconnected support vehicle comprised of a plurality of individual vehicles, unbroken by conduit/cable tensional support, wherein said conduit/cable would merely be supported in their entirety. Such configuration is generally assumed in similar application, though not expressly specified herein, to be spherical in its purest form and expanding two dimensionally therefrom into a cylindrical/spherically ended form with a smooth or corrugated skin surface, and (B) the number and positioning of conduit/cable per each individual vehicle and/or as said number and positioning relates to a modular plurality of vehicles affixed to one another and forming an expensive deployment network, and (C) the manner in which conduit/cable or a plurality thereof is affixed to said vehicles, as well as the manner in which the tethering-mooring apparatus is affixed to said vehicles (see FIGS. 2, 4, 6, 7 10 and 12 of Drawing). The positioning of said vehicles with respect to the conduit/cable requires that maximum heat dissipation of the cable be considered. Thus, should the vehicles encase the cable hot spots might occur, and it is preferable that tangential or offset secured vehicles would be advantageous. On another point, the degree of 'catenary slack' for sectional surfacing and free movement requirements, would determine the degree of naturally induced catenary curvature of the conduit/cable between said vehicles; due to the non-buoyant, flexible nature of the said conduit/cable, and its physical characteristics when suspended in a liquid. Hence, it is generally intended that where buoy support vehicle (or vehicles as related to multiple conduit/cable support) are spaced along the linear route of the conduit/cable in such manner that the said vehicles are not interconnected, said buoy vehicles would be interconnected by said conduit/cable exclusively; except in the instance of extreme hydroatmospheric conditions where a separate flexible tension member may be employed. The above remaining true in all instances except where said support vehicles are utilised in sufficient numbers for a given linear distance so as to form a fully interconnected support vehicle comprised of a plurality of individual vehicles, unbroken by conduit/cable tensional support, wherein said conduit/cable would merely be supported in their entirety. Additional component apparatus; (2) with respect to the stabilisation of the conduit/cable, as well as the said buoy support vehicles or a plurality of each in combination within a variable radial range of the specifically intended, (A) depth-level and density of deployment, and (B) the lateral placement at said depth-level, would be facilitated by flexible, light weight tethering-mooring line affixed to said buoy support vehicle apparatus in size, according to diameter and tensil strength, number and position as may be required to meet the demands of any given deployment application and the most severe hydroatmospheric conditions expectant herein, either in whole or varied to accommodate any part thereof; as well as with due consideration to surfacing the entire installation when in full deployment, most likely in individual parts thereof as may be required for maintainance, repair, replacement and/or additions of any components, and without disrupting the entire deployment unit in such instance.

More specifically relating to the above; the content of the tethering-mooring line would most likely be synthetic, such as nylon, polyester, kevlar, etc., with close to neutral buoyancy in water and a stretch quality of up to apx. 20%, and constructed in a double braided, high tensile strength design for maximum strength with minimal size/cost factor.

Figure 5:
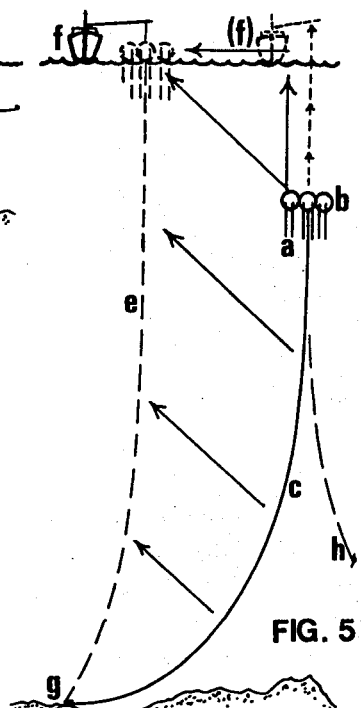
FIG. 5 is a frontal elevation of a single buoy (b) vehicle and one manner in which said vehicle and attached conduit/cable are brought to the surface by service vessel (f).

Deployment of said lines would consist of one or more individual tetherings from a central buoy vehicle attachment dependant upon conditions; with said line(s) (see FIG. 4, c and h of drawing) deployed with a scope factor up to apx. 2:1 with anchoring offset on the sea bottom to the extent of a plurality of factors; (A) drag factor with regard to prevailing current, (B) weight induced natural scope in deep water application, and (C) degree of scope required for free movement function of the attached conduit/cable (see FIG. 5 of drawing) in the manner described above. Consecutive tetherings following the deployment routing, would be determined in light of given deployment requirements or parts thereof. This includes the degree of fixed stability required under given depth and ambient conditions, as well as routing transversal (where employed), and multiple tetherings at a single vertex, etc.

Referring to said method of deployment and function according to factors stated above relating to system components, it is emphasised that use of 'modular' buoy support vehicles of variable size, configuration, number and positioning lends itself to a wide range of deployment application, or part thereof. The practical extent of said variance ranges from widely spaced vehicles, or groupings thereof for multiple conduit/cable support, with natural catenary of said conduit/cable as the tensional link factor and thus allowing the greatest hydrodynamic free movement of all system components, to the more formally structured continuously linked buoy vehicles wherein conduit/cable is merely supported and functions in no structural/linkage capacity (see FIGS. 3a, 3b and 3c of drawings).

In consideration of the above regarding design variability, in any given application the most critical factor is that all system components when fully deployed must maintain approximately specific gravity, within a maximum variance range radially circumscribing said conduit/cable, in order that said variable movement range, induced by any change in hydroatmospheric conditions, will be contained within said specified maximum and shall not materially affect the operating performance and stability of the deployment as a whole.

With regard to said radial variance range for a given deployment installation, and the maximum fluctuation from the routing, such factors as depth from the point of said deployment to the sea bottom and the resultant line scope factor, as well as the number of individual lines used at any one vertex of vehicle attachment (see FIGS. 4 and 5, c and n of drawing) and the geometric pattern of said lines, current stress factors, the degree of horizontal and vertical transversal for system sectional surfacing, and the structural variance of support vehicle design and positioning, would all materially contribute to the degree of said variance with respect to each individual deployment application or part thereof; and as such cannot be accurately specified except with regard to individually specified deployment applications. However, it should be noted that depth/density design specification for a given deployment or part thereof theoretically insures a moderate range of vertical movement in that as conduit/cable and attached support vehicles rise decreased density reduces vehicle buoyancy, and conversely as the unit sinks increased density so increases unit buoyancy thus slowing ascent or descent respectively. In addition, in that buoy support vehicles are modularly segmented and independently buoyant of one another the system is virtually insured of suspension support even in the event of several said vehicles failing to maintain buoyancy for any reason. Similarly, should the mooring link break loose from any of the buoy support vehicles to which it may be deployed, either consecutively or alternating in some pattern as required (see FIGS. 1, 2a, 2b, 2c of drawing), the result would be that buoy support vehicles and attached conduit/cable, without restraint of the line, would achieve positive buoyancy and thus maintain its relative position, with perhaps slight ascent in a given area. Thus summarily, the system would likely continue to function in most disruptive instances since flotation would maintain conduit/cable at a point above the depth-pressure armorment capacities and only in the event of a plurality of buoy failures in sufficient consecutive number would the conduit/cable fail due to extreme descent.

With respect to the laying operations in connection with a given deployment, it would seem logical without full scale testing to employ a series of flotation slave buoys in order to maintain the deployed conduit/cable on the water surface, and as the deployment vessel moves forward said slave buoys, on progressively lengthened tethers, could lower the entire unit gradually on a predetermined incline until all buoys were removed and brought forward to aid immediately laid sections.

As indicated the supports most likely would be spherical or in extended size, cyclindrical, with a corrugated surface depending upon the material of construction. This form is likely best suited to extreme depth-pressure; however, in any instance means for interconnecting supports to one another would require modification to spherical surfaces. This might best be achieved by flanges as indicated in the FIG. 7b. Where rectilinear configuration is used, such as might be possible with certain materials such as syntactic foam, interconnection would be no doubt be more easily achieved. However, hydrodynamics might suffer as a conseqence. Further, it is likely that electronic sensors for warning, depth control, etc. would be affixed to certain supports, in addition to means for any required tensional members between supports as may be deemed useful under extreme hydroatmospheric conditions; especially in that functional free movement of support and secured conduit or plurality thereof is an integral aspect of the said deployment scheme (via lengthened tethers of substantial scope, especially in deep sea application), consideration must be given to radial curvature should any two flotation elements move counter to one another. However, this is not a likely occurrence, in that hydrodynamically all components of the scheme would, in the event of disturbance, fluctuate in unison, as a single subsurface entity.

The structural configuration of the said radial supports would vary considerably, dependent upon the size and type of cable utilised and the degree of control required for the particular deployment. Outrigger extensions (such as in FIG. 13) are likely, as well as braided two way choke sleeves, to give broad example from rigid to flexible structural configuration. Additionally, in the case of embodiment two to FIG. 10 tetherings might be secured directly to intermediate members, should they be so disposed below the flotation elements.

It is obvious that numerous configurations of the applied method are possible according to specific deployment circumstances, ambient conditions and type of said cable used.

A final structural alternative would entail the use a central interconnection member wherein all, or at least the principal elements of the funtional whole would be adaptable thereto (including buoying and/or weighting elements, conductive elements and tethering/mooring lines). The configuration of this modular interconnection member may be of space frame or solid type with receiving apparatures on its surface. It might be so constructed so as to accept multiple buoyant means in modular format as specific installation requirements dictate, and one or more tethering lines at its underside or lower extremety. The said tetherings might be affixed to a universal type joint for freedom of movement in relation to the conductive elements secured thereto.

With respect to the use of weighting compensation means (as may be in certain instance be required in combination with said flotation means for buoyancy equalization), these would be modularly adaptable for interconnected use with the flotation means (in any functional embodiment). They would be employed in one or more sizes, as in the case of the floats (e.g., such as various cylindrical lengths according to described embodiments, with a constant girth for modular interconnection, to give an example). Since they would likely be smaller in size then the floats, they may be sandwiched between any two functional flots most likely.

Shore to shore functional system interconnections would incorporate the suspension principal in at least some portion as required, and at least one buoyant electrical power generation means may be interconnected therein.

The radial support carriers aforementioned could be simple sled-like assemblies of a determined curvature, or might be more complex, such as mentioned encasing choke sleeves. Such sleeves would be braided and split in two opposing sections on either side of the point of attachment to the float, so that they would choke about the cable if it slipped too far in either direction and thus restrained its movement while distributing the pressure over the entire surface of the cable sheath (not unlike a two way 'chinese handcuff' encasing the cable).

I claim:

1. A bouyant support apparatus for the subsurface suspension deployment of a number of thermally active electrical power transmission cable; and which comprises at least a single flotation element provided with supporting means and attachment recepticle projecting out from and attached to the flotation element, and interconnectable to other like means to form a network support configuration so as to space the said cable from one another, where multiply employed, at a point adjacent to the flotation element; and additionally providing attachment means for securing the support means to the flotation means, as well as one another.

2. A method for supporting at least a single thermally active submarine electrical power transmission cable; and which comprises suspending the cable below the surface by a number of buoyant support elements, and wherein the said cable is attached to at least a single modular support means which is attached to the buoyant support element, and which support means is capable of forming an interconnected network adjacent to the flotation support element for multiple cable support installation.

* * * * *